Patented Apr. 10, 1923.

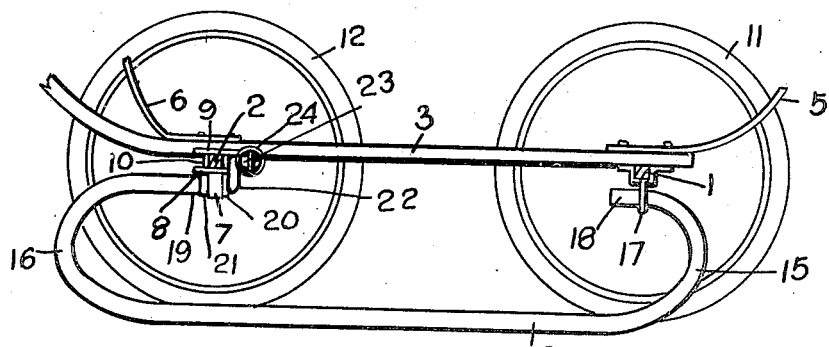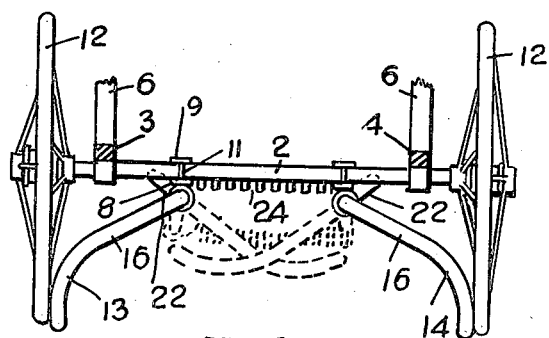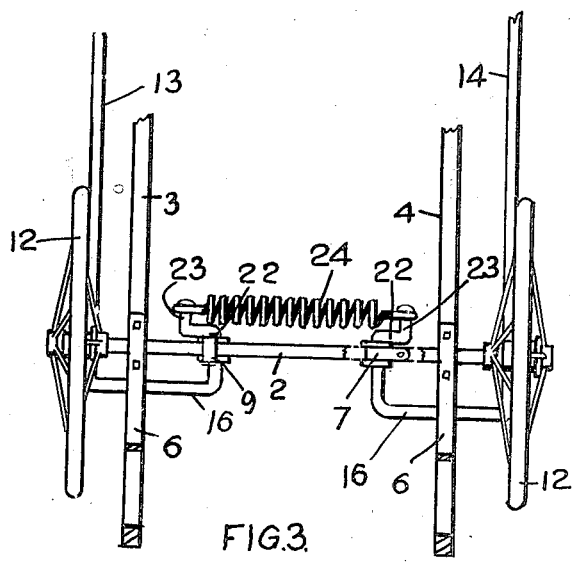

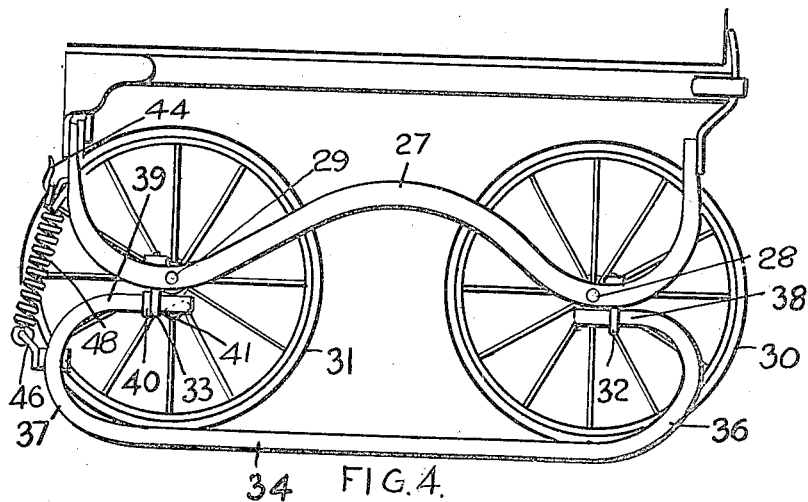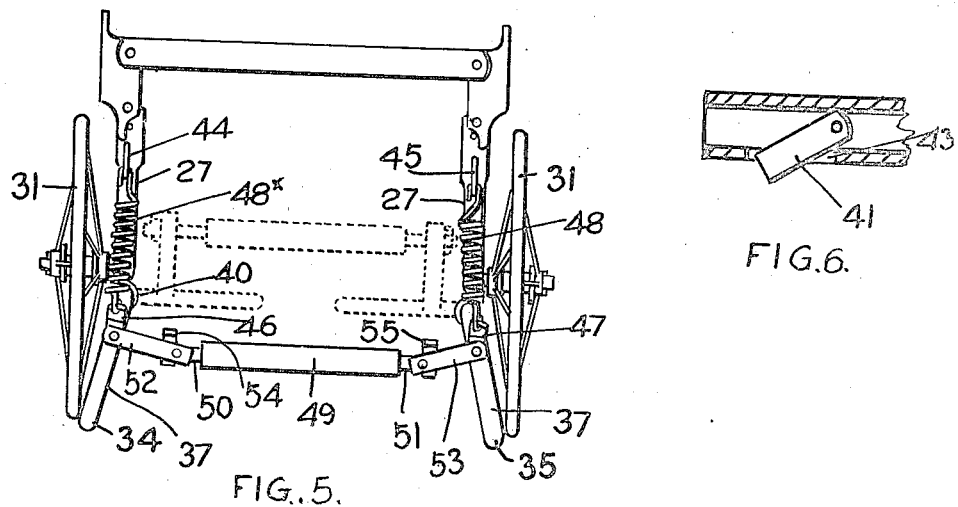

1,450,924

UNITED STATES PATENT OFFICE.

CRAVEN ROBERT ORD, OF GUELPH, ONTARIO, CANADA.

RUNNER ATTACHMENT FOR WHEELED CARRIAGES.

Application filed October 22, 1921. Serial No. 509,653.

*To all whom it may concern:*

Be it known that I, CRAVEN ROBERT ORD, a subject of the King of Great Britain, of the city of Guelph, in the county of Wellington, in the Province of Ontario, Canada, have invented certain new and useful Improvements in Runner Attachments for Wheeled Carriages, of which the following is a specification.

My invention relates to improvements in runner attachments for wheeled carriages and the object of the invention is to devise a runner attachment for wheeled carriages which is simple in construction, which is always ready for use and which will be absolutely rigid when in the operative position and which may be readily folded out of such operative position when not in use and it consists essentially of the following arrangement and construction of parts as hereinafter more particularly explained.

Fig. 1 is a longitudinal section through the lower portion of a wheeled carriage to which my invention is applied.

Fig. 2 is a rear elevation of the lower portion of a wheeled carriage showing my runner attachment in the operative position in full lines and in the folded or inoperative position by dotted lines.

Fig. 3 is a plan view of the rear portion of the wheeled carriage as shown in Figs. 1 and 2.

Fig. 4 is a longitudinal sectional view through the lower portion of a wheeled carriage of the foldable type and showing an alternative construction of runner attachment applicable to this type of carriage.

Fig. 5 is a rear end elevation of the parts shown in Fig. 4.

Fig. 6 is a sectional detail of one of my gravity locks employed in the construction shown in Figs. 4 and 5.

In the drawings like characters of reference indicate the corresponding parts in each figure.

I will first refer to Figs. 1, 2, 3 and 4 in which 1 and 2 are the front and rear axles which are connected together in the usual manner by the longitudinal bars 3 and 4 on which are mounted front and rear spring 5 and 6 which support the body of the carriage. 7 are brackets, each of which are in the form of a U having its arms disposed horizontally, one arm of which is secured to a clamping plate 8 extending below the rear axle 2. 9 is a similar plate which extends above the rear axle 2 and is connected to the plate 8 by means of bolts 10 thereby securely clamping the bracket 7 in a stationary position depending from the axle 2.

Although I have shown the bracket 7 depending from the axle it may if found desirable be secured above the axle 2 so as to extend upward therefrom.

11 and 12 are the front and rear wheels of the carriage, the wheels 12 being mounted at each end of the axle 2 in the usual manner. 13 and 14 are runner members the front and rear ends 15 and 16 of which curve upward and inward beneath the front axle 1 and rear axle 3. 17 are eye bolts secured in the axle 1 and through which the inwardly curved front end 18 of each runner 13 and 14 extends. The inwardly extending end 19 of the rear portion 16 of each runner member 13 and 14 is provided with a pair of collars 20 and 21 between which the bracket member 7 extends. The portion 19 of each inner member 13 and 14 is provided with a crank end 22 which when in the operative position extends outward in an inclined direction, the arm of each crank then turning inward at 23. To the inwardly extending ends of the cranks 22 is secured the ends of a tension spring 24 which tends to draw the crank arms 22 together and the runner members 13 and 14 when in the operative position outward.

It will be noticed particularly on referring to Fig. 2 that the portion 16 of the runner members extend outward in an inclined direction from their bearing support and then curve downward into a vertical plane extending slightly below the lower peripheral portion of the wheels 11 and 12 of the wheeled carriage. The portions 15, one of which is shown in Fig. 1 and which form the opposite end of each runner correspond in construction to the portions 16 as illustrated in Fig. 2.

It will thus be seen that the tension of the spring 24 and the weight on runner forces the lower horizontal portion of each runner member against the lower portion of the wheels 11 and 12 thereby forming a bearing support for the runners holding them in a perfectly rigid position.

It will be noticed on referring to Fig. 3 that the runner member 13 is slightly shorter in length than the runner member 14.

When it is desired to use the wheeled carriage in the ordinary way so that it is carried on the wheels 11 and 12, the runner members 13 and 14 are swung upward into the dotted position shown in Fig. 2. By swinging the runner members 13 and 14 to this position, the cranks are carried below their center of swing so that the spring 24 tends to draw the runner members into the dotted position shown in Fig. 2.

It will also be noted that the tension of the spring 24 serves to pull the inwardly directed portions 19 of the runner members into the bases of the U brackets.

I will now refer to Figs. 5, 6 and 7. In these figures I have shown a construction of runner attachment which is applicable to a folding type of carriage. In these figures 27 are the curved side bars of the carriage frame in which are secured stud axles 28 and 29 on which are mounted the front wheels 30 and rear wheels 31.

32 and 33 are eye bolts secured respectively in the side bars 27 in proximity to the front axle 28 and rear axle 29. 34 and 35 are runner members each having curved front ends 36 and rear ends 37. The upper portion of each curved end 36 extends horizontally inward at 38 through the eye bolt 32 and the upper portion of each upwardly curved end 37 extends inward at 39 so as to extend through an eye bolt 33, its inward movement being limited by the collar 40 and locked from outward movement by a gravity lock 41 which depends through the slot 42 formed in the runner.

It will be seen that as the end 39 of the runner member is pushed through the eye bolt 33, the gravity lock 41 is forced upward into the runner through the slot 42 and as soon as the collar 40 contacts with the eye bolt 33 and the gravity lock 41 has passed such eye bolt, such lock drops into the locking position preventing the inadvertent withdrawal of the runner.

44 and 45 are hooks secured to the rear portion of the bars 27. The hooks 44 and 45 are prferably swivel hooks. 46 and 47 are brackets pivotally connected to the portions 37 of the runners 34 and 35. 48 and 48ˣ are springs. The upper ends of the springs 47 and 48 are connected to the hooks 44 and 45 and the lower ends to the brackets 46 and 47 thereby tending to draw the runner members 34 and 35 upward in their outwardly inclined position and therefore against the wheels 30 and 31 of the carriage.

49 is a tube which is located in a crosswise position between the rear ends of the runner members 34 and 35. 50 and 51 are bar portions slidable within the tube 49 and 52 and 53 are links. The link 52 is pivotally connected at one end to the bar portion 50 and at the opposite end to the portion 37 of the runner member 34. The link 53 is pivotally connected at one end to the bar portion 51 and at the opposite end to the portion 37 of the runner 35. 54 and 55 are stop projections extending upward from the bar portions 50 and 51, such projections extending laterally over the links 52 and 53 at their upper ends.

It will be noted that the links 52 and 53 are pivoted to the bar portions 50 and 51 slightly within the aforesaid projections 54 and 55 and that the links 52 and 53 extend slightly beyond their pivot points so as to form projections which engage with the projections 54 and 55 when the parts are swung to the dotted position shown in Fig. 5. In this dotted position or the position the parts assume when the runner members are not in use such runner members extend horizontally inward from each side bar 27, the remaining parts assuming the dotted position indicated above the runner members.

To put the runners in operation, the carriage is held firmly by the handle and tilted to one side. The foot is then placed on the long runner giving it a downward and outward motion, into position against wheel. The carriage is then tilted to the other side and the other runner pushed into position in the same manner.

To withdraw the bar portion 50 the link 52 is swung upward on its outer pivot carrying the sleeve 49 in an upwardly inclined position, the inner end of the link 52 swinging on the pivot connection between such link and the bar 50 until the parts are brought to such a position that the bar 50 can be withdrawn.

From this description it will be seen that I have devised a very simple construction of runner attachments for wheeled carriages which will be rigidly held when in the operative position by being forced outward against the wheels of the carriage and which when not in use may be folded beneath in compact form and which may be readily swung from the operative to the inoperative position or vice versa whenever desired.

The runners and carrying brackets can be reversed under carriage thus bringing cranks and spring to the front.

What I claim as my invention is:

1. In a runner attachment for wheeled carriages, the combination with the frame structure and front and rear wheels, of runner members swung upon the frame structure, a crank arm carried by an end of each of the runner members, a tension spring extending between the crank arms, the cranks and spring being so disposed as to force the runner members outward against the aforesaid wheels when the runner members are spread apart and to draw such runner members inward when the runner members are manually forced inward and upward towards the carriage frame.

2. In a runner attachment for wheeled carriages, the combination with the frame including the front and rear axles and the wheels of the carriage, of bearing members carried by the front and rear axles, runner members swung within such bearing members, a crank arm extending from an end of each runner member, and a spring connecting the crank arms together to exert a pull crosswise of the carriage.

3. In a runner attachment for wheeled carriages, the combination with the carriage frame including the front and rear axles and the carriage wheels, of eye bearings attached to the front axle at each side of the center, a bearing bracket in the form of a horizontally disposed U secured to the rear axle at each side of the center and in longitudinal alignment with the aforesaid eye bolts, runner members each having an inturned front end journalled in one of the aforesaid eye bolts and each having an inturned rear end journalled in one of the aforesaid brackets and a crank arm extending from the rear end of each runner member, and a tension spring connecting the crank arms together and adapted to force the runner members outward when in the operative position when against the wheels and inward and upward when in the inoperative position

CRAVEN ROBERT ORD.